Patented Oct. 17, 1933

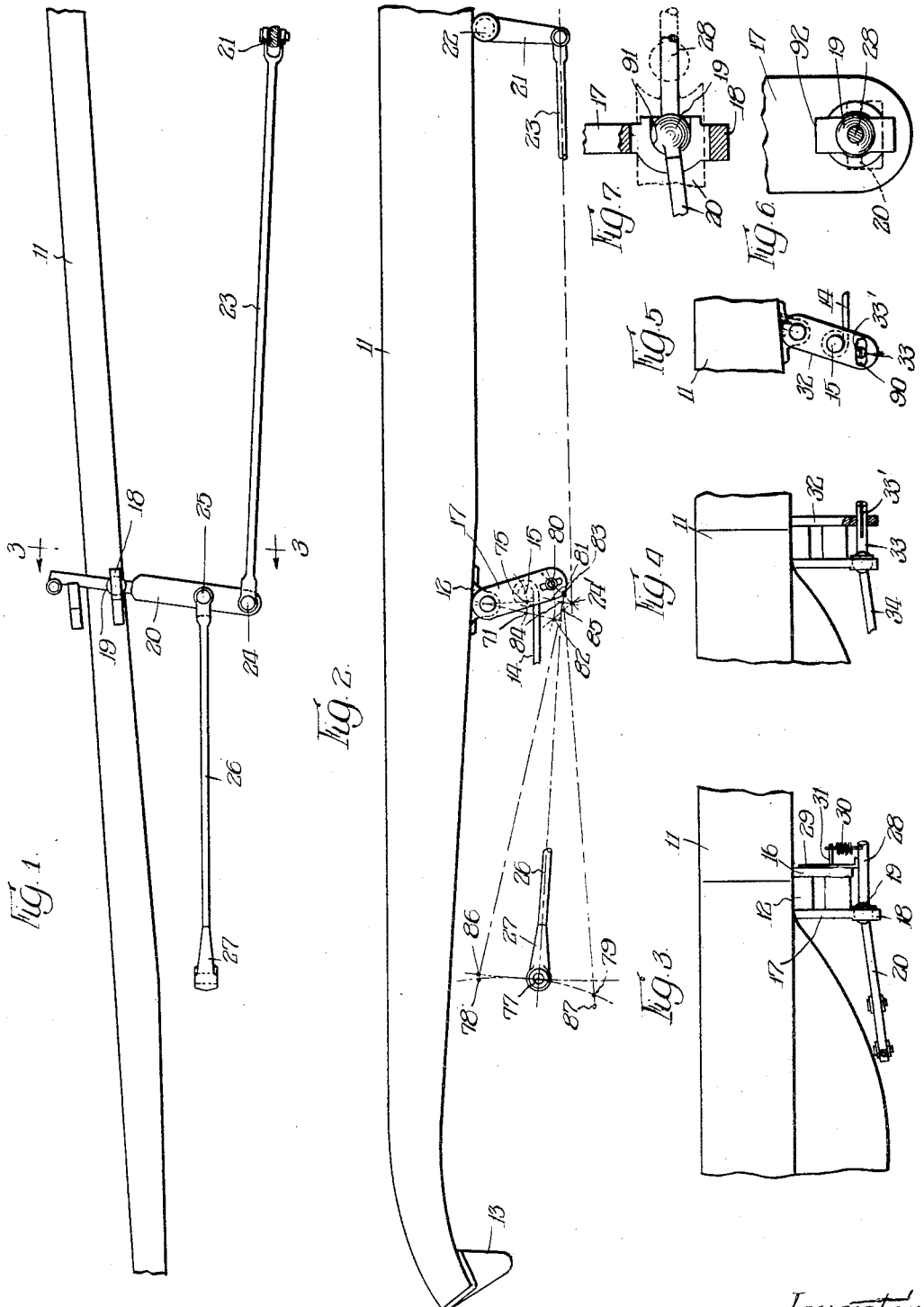

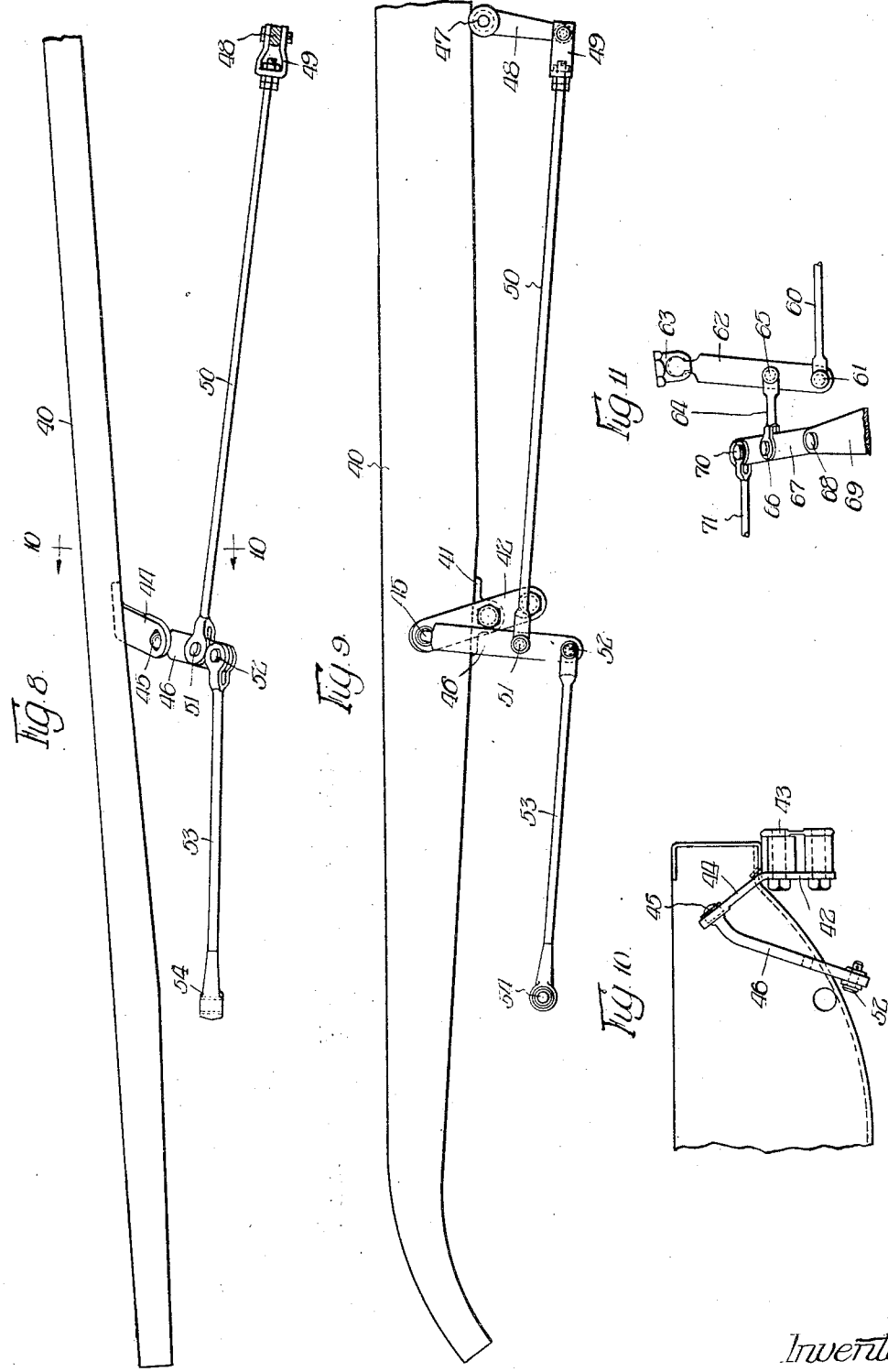

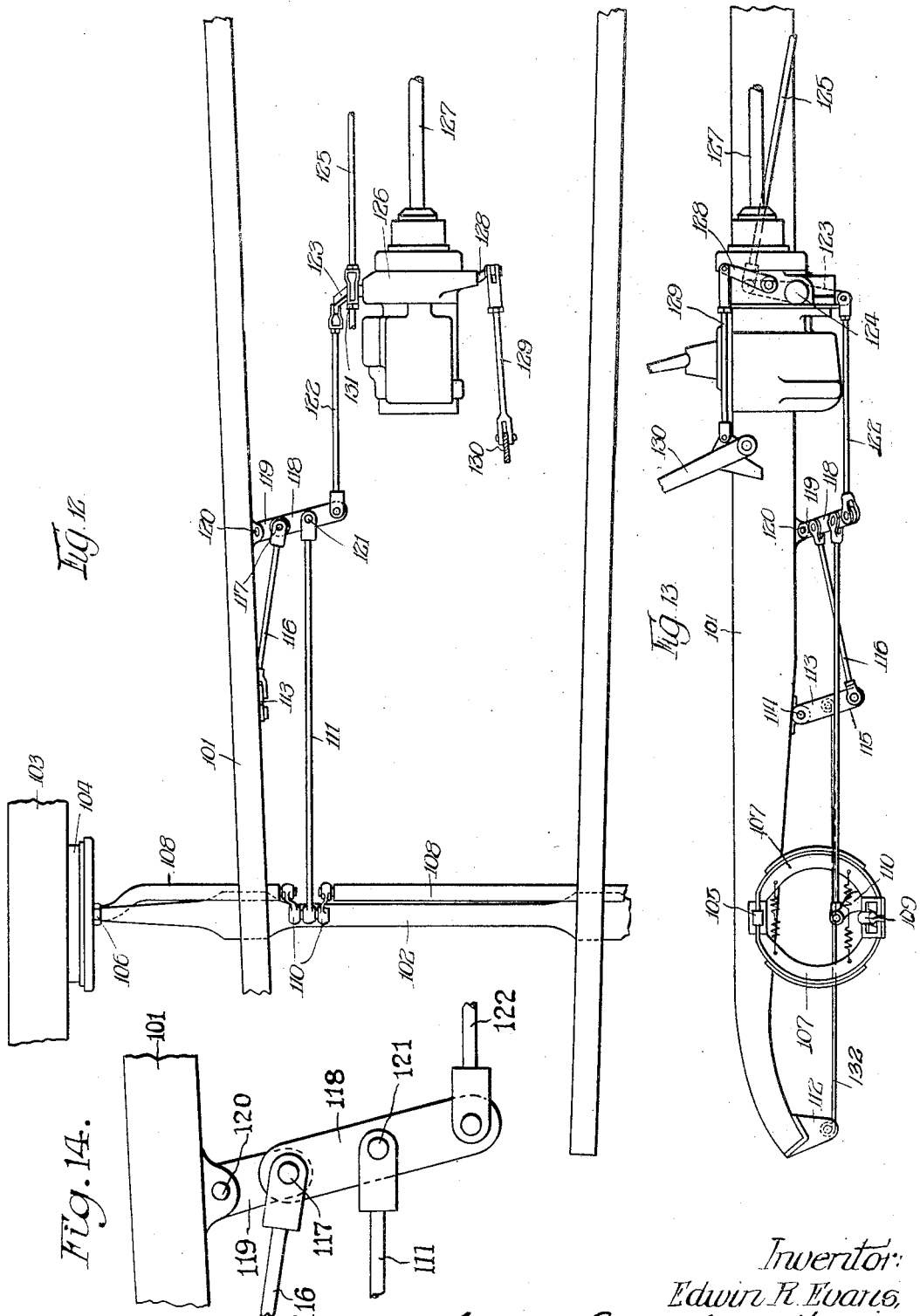

1,930,674

UNITED STATES PATENT OFFICE 1,930,674

RELAY FOR BRAKE RIGGING

Edwin R. Evans, Chicago, Ill.

Application June 24, 1929. Serial No. 373,102

18 Claims. (Cl. 188—190)

This invention relates to a new and improved brake linkage construction and more particularly to a brake linkage including a relay connected at an intermediate point in the linkage.

The invention relates to vehicle brake construction with particular reference to vehicle brakes on automobiles in which brakes are applied to all four wheels. A part of the brake construction is carried directly by the wheel or the axles adjacent to the wheels and the brake operating mechanism is carried upon the chassis. Since the vehicles are spring mounted there is a relative movement between the chassis and the axles. It is necessary, therefore, to so connect the brake operating mechanism to the brakes carried by the wheel in such manner that the movement of the wheels and the brake parts carried thereby upon spring bound and rebound will not be such as to cause a pull upon the brake linkage, thereby applying the brakes.

The springs in general use are of the semi-elliptic type which are pivotally connected to the chassis at one end and which are connected to the chassis frame by means of a shackle at the other end of the spring. The wheel axle is connected to an intermediate portion of the spring. Due to the axle connection to the spring and the pivoted and shackle connection of the spring to the chassis, the movement of the axle and the wheel together with any brake parts carried thereby is not a rectilinear vertical movement under bound and rebound. It is not moreover an arcuate movement about the pivoted end of the spring as a centre. This is caused by the fact that the spring is of different thickness and resilience at different portions therein, that it is curved and that the curve of the spring changes under pressure and that the movement is to an extent controlled by the limitations imposed by the shackle on the other end of the spring. Special care is, therefore, necessary in order to so design the linkage connecting the wheel brakes and brake applying mechanism, as to avoid brake application upon bound or rebound.

It has been found by test that the movement of the axle and its associated brake parts upon bound or rebound is substantially on an arc about a centre which is offset somewhat therefrom, but is located adjacent the pivoted end of the spring. In vehicle front springs the spring is pivoted at its front end, and shackled at its rear end, in the usual automobile construction. This causes the brake connection carried by the front wheel or axle to move about an arc having its center forward of the front axle and adjacent to the front portion of the chassis frame. On the other hand the brake operating rod connected to the wheel brake extends from the rear of the axle to the point of connection with the brake assembly on the wheel, and therefore, normally moves in an arc about a centre located in the rear of the spring. Obviously these arcs would normally be tangent at the point of normal spring location, and if so they will be separated both upon bound and rebound. This separation, therefore, would have the effect of pulling upon the brake pull rod and causing the brake operating lever connected thereto to move in the direction of the pull rod with the consequent partial brake application, unless there is considerable play in the parts with freedom for such movement.

It is an object of the present invention to provide a new and improved brake linkage construction and more particularly such construction including relay means located between the brake applying apparatus and the wheel brake mechanism.

It is a further object to provide apparatus of this character in which the parts are so designed and the relay so located as to minimize strain and operating stresses upon the brakes on bound or rebound.

It is an additional object to provide such a construction in which the linkage relay is carried by a part moving upon spring movement, and has a movement imparted thereto upon spring bound or rebound.

It is also an object to provide a construction of this character in which the leverage and travel between the brake operating mechanism and the brake may be modified by means of the relay and connections thereto.

It is an additional object to provide a construction which is simple in design and adapted for commercial manufacture.

It is also an object to provide a construction which may be applied to existing vehicle and chassis designs without material alterations therein.

Other and further objects will appear as the description proceeds.

I have illustrated certain preferred embodiments of my invention in the accompanying drawings in which Figure 1 is a diagrammatic plan view showing my brake linkage connection and the immediately associated chassis parts;

Figure 2 is a side elevation of the parts shown in Figure 1 with the addition of certain points indicating the positions taken by the parts under spring bound and rebound;

Figure 3 is a cross section taken on line 3—3 of Figure 1;

Figure 4 is a fragmentary view similar to Figure 3, but showing a modified form of construction;

Figure 5 is a side view of the construction shown in Figure 4;

Figure 6 is an enlarged view of the ball and socket connection shown in Figures 3, 4 and 5;

Figure 7 is a fragmentary cross-section of the construction of Figure 6;

Figure 8 is a plan view similar to Figure 1 showing a modification of the construction;

Figure 9 is an elevation of the form of construction shown in Figure 8;

Figure 10 is a fragmentary cross section taken on line 10—10 of Figure 8;

Figure 11 is a fragmentary view of a form of multiple lever relay;

Figure 12 is a plan view of part of a chassis and a further modified form of relay and linkage;

Figure 13 is a diagrammatic side elevation of the form of construction shown in Figure 12, and Figure 14 is a fragmentary view on an enlarged scale showing the relay of Figures 12 and 13.

Referring first to the form of construction shown in Figures 1, 2 and 3, a chassis side frame member has been indicated at 11, this member being provided with the pivot member 12 adapted to support a spring shackle for the rear end of a front spring, the front end of which is pivoted on the member 13, secured to the forward end of the chassis side frame 11. The rear end of the spring has been indicated at 14 as connected to a shackle pin located in normal position at the point 15. The shackle is shown as constructed with the outer member 16 and inner member 17. The member 17 has its lower end extended below the connection to the rear end of the spring, and this extended portion 18 is provided with a ball socket which receives the ball portion 19 formed on the relay member 20. The brake application is obtained by any source of manual or power operating mechanism which serves to swing the arm 21 carried by shaft 22 as shown in Figure 2 in a counter-clockwise direction in applying the brakes. The arm 21 is connected by the pull rod 23 with the point 24 located on the end of the relay member 20, and the intermediate point 25 of the relay member 20 carries a pivot pin to which is connected the pull rod 26, which has a connector end 27 adapted to be connected to any desired form of brake operating mechanism directly carried by the wheels or the wheel axle located adjacent and connected to the front spring 14.

The particular form of construction of the brakes or brake operating mechanism forms no part of the present invention and have not been shown in detail herein. The brakes to be used may be those of the form shown in my copending application, Serial No. 366,217, filed May 27, 1927, and the general brake operating mechanism may be similar to those shown in my copending application, Serial No. 367,590, filed May 31, 1929. It will be understood, however, that the present form of construction may be used with other forms of brakes and brake applying means.

The relay member 20 is provided with an extended portion 28 which extends below and across the spring shackle and which in the form of construction shown in Figure 3 bears against a stop member 29 being held against such member by the spring 30 which is connected to the end 28 and to a pin 31 shown as carried by the stop member 29. This spring and stop member permit the end portion 28 to yieldingly spring downward while normally holding them in the position shown in Figure 3. In the form of construction shown in Figures 4 and 5, the outer spring shackle member 32 is provided with a slotted opening through which the end 33 of the relay member 34 extends. The end of the portion 33 is split at 33' and spread slightly so as to engage the edges of the slot to prevent rattle. The slot 90 is elongated in a horizontal plane and permits horizontal movements of the relay while restraining it against vertical movement. This connection, therefore, serves to maintain the relay member always in a predetermined horizontal or approximately horizontal plane.

In Figures 6 and 7, I have shown in detail one form of connection between the relay 20 and shackle member 17. The end 18 of the shackle member 17 is provided with the hemispherical socket 91 to receive the ball 19 and with the vertically extending slotted portion 92 intersecting the ball socket. The relay 20 is turned to pass through the slot 92 and then turned about its axis after the ball 19 is seated in the socket. The relay 20 is held against rotation about its axis by its pull rod connections so that the ball is retained in the socket by the shoulders on the flat portion 20. The relay has been shown partly inserted by means of broken lines in Figure 7.

Referring now to the form of construction shown in Figures 8, 9 and 10, the chassis frame member 40 is provided with the shackle pivot anchor 41 which carries the shackle side member 42 on the inside of the chassis frame. The outer shackle side member 43 is carried on the outer side as shown in Figure 10. The shackle side member 42 has an upwardly extended and inwardly inclined portion 44, which carries adjacent its upper end a socket adapted to receive the ball end 45 on the upper end of the relay member 46. The cross shaft 47 carrying the arm 48 is connected by the connector member 49 to the pull rod 50. The rear end of this pull rod 50 is pivotally connected at 51 to an intermediate point on the relay lever 46. The lower end of the relay member 46 carries a pivot pin 52 upon which is pivotally connected the pull rod 53, the forward end of which carries the connector 54 for connection to the brake operating mechanism, which may be of any form of construction as stated in connection with Figures 1, 2, and 3.

It will be noted that in this form of construction the connection between the brake operating mechanism and the relay is located intermediate the pivoted end of the relay and the connection of the forward pull rod section 53 to the relay. This is contrary to the form of construction shown in Figures 1, 2 and 3 in which the pull rod section 23 connected to the brake operating mechanism is connected at the end of the relay member 20 with the forward pull rod section 26 pivoted at 25 to an intermediate portion of the relay member 20. In the form of construction shown in Figures 1, 2 and 3, the relay decreases brake travel and in Figures 8, 9 and 10 serves to increase the brake travel.

In the form of construction shown in Figure 11, I have shown a compound linkage lay-out, in which the pull rod 60 would be connected to any brake operating mechanism and in which its forward end is pivoted at 61 to the free end of the relay member 62. The other end of the relay member is provided with a ball connection which is secured by the member 63 upon a spring shackle in a manner similar to that in which the relays of the forms above described are connected to the shackles. The short link 64 is pivoted at 65 to the relay member 62 and is pivotally connected at 66 to the secondary lever 67 which is pivotally connected at 68 to a bracket 69. This bracket 69 may extend from any fixed portion or portions fixedly secured upon the chassis and moving with the chassis rather than with the wheels and axle. This bracket may extend from a chassis frame member or from an engine member. The free end of the secondary relay member 67 is pivotally connected at 70 to a forward pull rod 71 which may be connected to any usual form of brake as described with the forward pull rod section of the other forms of construction. By means of such a compound relay all error or difference in movement between brake and pull rod may be eliminated.

The form of construction shown in Figures 12 and 13 comprises a chassis frame 101, supported by springs 132 from the front axle 102. The front axle carries the wheels 103 which in turn carry the brake drum 104. The brake shoe pivot 105 is supported from the axles and is adjustable by means of nut 106 to vary the adjustment of the brake shoes 107. The transverse brake operating shafts 108 are pivotally supported on the axle 102 and carry the brake cams 109 fitting between the ends of the shoes 107. Rotation of the cams in a clockwise direction in Figure 13 serves to separate the brake shoes and apply the brakes. This rotation is given by means of the crank arms 110, on the shafts 108, these crank arms being connected to the pull rod 111. This brake and cross shaft construction is shown and described in greater detail in my two copending applications referred to above. The forward springs are anchored to the chassis frame 101 by the anchor pivot members 112 at their forward ends and their rear ends are carried by the shackles 113 which are pivoted to the side frame members at 114. The shackle 113 has an extended portion 115 to which is pivotally connected the link 116 whose rear end is pivoted at 117 to the meeting ends of the relay members 118 and 119. The relay member 119 is pivoted at 120 to the side frame member.

The relay member 118 has the forward pull rod section 111 pivoted thereto at the intermediate point. The other end of the relay member 118 is pivotally connected to the lower end of the double brake operating lever 123. This lever 123 is carried by cross shaft 124 and may be operated by rotation of that shaft. The upper end of the lever 123 is connected to the pull rod 125 which leads to the rear brakes which have not been shown but which may be generally similar to the front brakes.

In the form of construction shown, the shaft 124 is rocked by means of a power device housed in the casing 126 and deriving its power from the vehicle propeller shaft 127. The power device is controlled in its operation by means of the lever 128, pull rod 129 and lever 130 which latter may be provided with a pedal for foot operation. A hand brake may be connected to the yoke 131. The form of construction of the power device forms no part of the present invention and although my improved linkages and relays are particularly effective with such power devices they may also be used with other power devices or with brake systems adapted to be directly pedal or manually operated.

Referring now to the form of construction shown in Figures 1, 2, and 3, the end of the spring 14 is located at the point 15 in normal position of the part. This point 15 moves to the point 75 on bound and to the point 71 on rebound. The actual location of the brake connection or point of connection to the brake operating means under normal load is positioned at the point 77 of Figure 2 which is coincident with the normal location of the front end 27 of the pull rod section 26. The actual position of the connector piece 77 carried by the brake assemblies on the axles and wheels is then plotted under bound and rebound condition and it is found that these positions are located at 78 on bound and at 79 on rebound. It is, therefore, desirable to so position and proportion the relay link that the end 27 of the pull rod 26 will also move exactly to positions 78 and 79 upon bound and rebound.

It is found by plotting the positions of the spring shackle pin 15 on bound and rebound that it is not desirable to have the rear end of the pull rod 26 pivoted exactly on the point 15 to which the spring is connected in order to move to the bound and rebound positions 75 and 71 as this would not give neutralization of the error and place the connector 27 in the parted positions 78 and 79 which are those of the wheel brake connections on bound and rebound. I find it necessary to move out on the spring shackle to a point indicated at 80 which moves on bound to a point 81 and on rebound to a point 82. The distance we move out on this shackle is controlled first by the travel we wish on the brake rod to neutralize the spring action and the relation we wish the lever arm between the pivot point 19 of the relay and the pivot point 25 of the front rod 26 to bear to the lever arm between the pivot 19 and the pivotal connection 24 of the rear pull rod section 23. This leverage between the front and rear pull rods is controlled by the general chassis leverage and in the particular case illustrated in Figures 1 to 3 has been shown as bearing the relation of 1½ to 1.

Considering the movement of the parts under operating conditions of the vehicle the point of connection 24 between the rear pull rod section 23 and the relay member 20 must be considered as a fixed point. With the brakes in the normal position and the brake connection point 77 moving between the points 78 and 79 on bound and rebound, the position of the pull rod 23 remains constant as long as no brake application is made. Therefore, the end 24 of the pull rod 23 must be considered as a fixed point under normal spring operation of the vehicle. In the diagrammatic showing of Figure 2 this connection 24 has been shown as located at the point 24' which remains fixed, as stated. Since the point of connection between the link 20 and the lower end of the shackle member 17 moves from point 80 to point 81 on bound and to point 82 on rebound, it will, therefore, be apparent that the point of connection 25 to the front pull rod 26 is normally located in the diagrammatic showing of Figure 2 at the point 83 and moves to the point 84 on bound and to point 85 on rebound. On bound the front end of the pull rod 26 moves to the point 86 almost coincident with the point 78 which is the locus of the wheel brake connecting member 77 on bound. On rebound the front end of the rod 26 goes to the point 87 which is slightly beyond the point 79 which is the locus of the wheel brake connector on rebound.

It will be seen that this design while it does not cause the arcs of movements of the pull rods to exactly coincide with the arcs of movement of the wheel carried brake mechanism, nevertheless causes the relation between these movements to be such as to prevent any substantial brake application or stresses or injury to the parts. In the case of bound there will be a slight pull upon the brakes, in the parts as proportioned in Figures 1 to 3. This very slight pull upon the brakes is immaterial, however, as on the bound the front axle is loaded by the shock of the bound and no harm is done. On rebound it will be seen that the rod is normally in advance of the wheel carried brake mechanism which merely means that the rod is buckled slightly and there is no tendency to apply the brakes on rebound.

It will be noted that while the pivot point 80 of the relay as shown diagrammatically in Figure 2 is located on the extension of the axis of the shackle, it is possible to modify the arc of movement of the relay and associated pull rods by locating the pivot point 80 to one side of the axis of the shackle. Thus by plotting the various points a point of connection and lever arm may be readily worked out to give any desired relation between the arcs of movement of the end of the pull rod and of the axle carried brake portions within a considerable range of possible relations.

The form of construction shown in Figures 8, 9 and 10 is, in general, similar in its mode of operation to that shown in Figures 1, 2 and 3. By means of pivoting the relay member 46 at a point above the shackle instead of below it, I secure a relay properly located and with its lever arms properly proportioned so that the power pull rod 50 may be connected at an intermediate point 51, while the forward pull rod 53 is connected adjacent the end of the relay at the point 52. In the proportions shown, the lever arm of the power pull rod bears the relation of one to one and one-half to the forward or brake pull rod 53. It will be apparent that the relations between these lever arms may be varied as desired, and by using either the forms shown in Figures 1, 2 and 3 or the forms shown in Figures 8, 9 and 10, any desired relationship may be had between the power transmitted and the travel of the sections of the pull rods on opposite sides of the relay.

In the form shown in Figures 8, 9 and 10, the pivot point 45 of the relay has been located in prolongation of the axis of the shackle, but it will be apparent that this pivot point may be located upon either side of the axis if desired, and by means of such modification any desired relation between the arcs of movements of the brake parts carried by the axle and of the arc of movement of the end 54 of the pull rod section 53, may be provided.

In the form of construction in Figures 8, 9 and 10 it will be understood that the point 51 where the pull rod 50 is connected to the relay 46 will be considered as the neutral center or fixed point under normal vehicle operation where the brakes are not applied. Thus although the pivot point 45, as seen in Figure 9, moves in the rearward direction under bound or rebound, the point 52 of connection to the forward pull rod section 53 will move in the forward direction since it is on the other side of the pivot 51. It will be apparent from a consideration of the diagram of Figure 2, that this movement of the forward pull rod section cannot be accomplished if the relay is pivoted as shown in Figures 1, 2 and 3, and the connections between the forward and rear pull rods were interchanged in that form of construction in the endeavor to modify the lever arms as is done in Figures 8, 9 and 10. Therefore, in order to accomplish the increase in travel of the forward pull rod section 53 it is essential to pivot the relay above the spring shackle as shown in Figures 8, 9 and 10.

In a number of installations it might be undesirable to have a forward pull rod section of substantially the length of that of the spring, or such a pull rod section having its rear pivot located adjacent the spring shackle. The form of construction shown in Figures 12 and 13 makes it possible to have the desired length of forward pull rod section and still to secure the advantage of the modification of the location of the relay being accomplished by the movement of the spring shackle under bound and rebound. Here the spring 132 is connected at one end to the spring shackle 113 which shackle is coupled to the relay by means of the connecting link 116. The relay is composed of two links 118 and 119 which are pivotally connected to the end of the link 116 at the point 117. The end 120 of the shorter link 119 is fixed by being pivotally secured to the chassis and the outer end of relay member 118 is fixed by being pivotally secured to the end of the brake applying pull rod 122. The movement of the connecting link 116, however, serves to pull forward on the adjacent ends of both relay sections 118 and 119, which consequently moves forward the pivot connection 121 to the forward pull rod section 111. The relation between the several parts may be so designed that the movement of the pull rod 111 is such as to cause its end to conform to the arc of movement of the lever arms 110 on the transverse brake shafts 108 when the axle 102 moves up and down on bound and rebound. The relative lengths of the relay sections 118 and 119 and the points of connection of the several parts to these links, may be modified to give any desired ratio of movement between the several parts.

If desired to give the proper movement, the link 116 may be connected to the spring shackle 113 at a point above the spring shackle in the manner shown in Figures 8, 9 and 10 rather than below the spring shackle as actually shown in Figures 12 and 13, which conforms to the design of Figures 1, 2 and 3. The form of construction shown in Figures 12 and 13 is particularly important because of the fact that the relays are commonly used to carry the brake pull rods around intervening chassis elements or around the engine or other parts carried by the chassis. This cannot always be accomplished by means of a relay directly pivoted upon the spring shackle, but may be readily accomplished with this type of construction where the relay may be located as desired. If desired, the member 119 may be made parallel to the shackle member 115 and connected by link 116 to give a parallel motion so as to transfer exactly the motion of the spring shackle.

While I have shown certain preferred embodiments of my invention by way of illustration, it is capable of further variation and modification to meet varying conditions, and I contemplate such changes and modifications as come within the spirit and scope of the appended claims.

I claim:

1. In combination with a vehicle chassis, a spring, a spring shackle, a brake linkage, including a relay located in a plane making an angle with the vertical, and a pivotal connection between the relay and spring shackle whereby the movement of the shackle under spring bound and rebound modifies the location of parts of the brake linkage.

2. In combination with a vehicle chassis, a spring, a spring shackle, a brake linkage including a relay pivotally supported at an angle by the spring shackle whereby the movement of the shackle under spring bound and rebound modifies the location of parts of the brake linkage.

3. In combination with a vehicle chassis, a spring, a spring shackle, a brake linkage including a relay pivotally connected to the spring shackle in such manner that the movement of the shackle causes a movement of the relay in a plane at an angle to the plane of the shackle and under spring bound and rebound modifies the location of parts of the brake linkage.

4. In combination with a vehicle chassis, a spring, a spring shackle, a brake linkage including a relay, a connection between the relay and spring shackle whereby the relay is maintained in a plane at an angle to the plane of the spring shackle, and forwardly and rearwardly extending pull rods connected to the relay at spaced points whereby a variation is provided between the movement of the pull rods.

5. In combination with a vehicle chassis, a spring, a spring shackle, a brake linkage including a relay, an extension on the spring shackle, and a connection between the extension and relay.

6. In combination with a vehicle chassis, a spring, a spring shackle, a brake linkage including a relay located in a plane making an angle with the vertical, a connection between the relay and spring shackle, and forwardly and rearwardly extending pull rods connected to the relay at spaced points whereby a variation is provided between the movement of the pull rods.

7. In combination with a vehicle chassis, a spring, a spring shackle, a brake linkage including a relay, a downwardly extending portion on the spring shackle, the relay being pivotally supported in said extension, the relay extending inwardly of the chassis.

8. In combination with a vehicle chassis, a spring, a spring shackle, a brake linkage including a relay, and a downwardly extending portion on the spring shackle, the relay being pivotally supported in said extension, the relay having a portion connected to the shackle to limit pivotal movement of the relay.

9. In combination with a vehicle chassis, a spring, a spring shackle, a brake linkage including a relay, and a downwardly extending portion on the spring shackle, the relay being pivotally supported in said extension, the relay having a portion extending transversely of the shackle and connected thereto to maintain the relay in normal position.

10. In combination with a vehicle chassis, a brake linkage comprising a relay pivotally supported on a spring shackle in such manner as to move freely in a plane at an angle to the vertical, and forwardly and rearwardly extending pull rods connected to said relay.

11. In a vehicle construction, a spring shackle, an extension thereon, a brake relay pivoted in said extension and locked in pivoted relation, when in operative position, by means integral with the shackle extension and relay.

12. In a vehicle construction, a spring shackle, an extension thereon, a brake relay extending through the shackle extension, a spherical seat in the extension, the extension having an enlarged opening formed therein adjacent the seat whereby the relay may be passed through the shackle extension, and turned to lock it in place against the spherical seat.

13. In combination with a vehicle chassis, a spring having a fixed pivot on the chassis at one end and movably supported at its other end on the chassis, a link movably supported on said chassis at a point spaced from the movable end of said spring, means for transmitting the movement from the movable end of said spring to said link, a brake linkage including a relay pivotally supported by said link and forwardly and rearwardly extending brake pull rods of said brake linkage connected to the relay at spaced points.

14. In combination with a vehicle chassis, a spring, a spring shackle movably supporting one end of said spring on said chassis, a link pivotally supported on said chassis spaced at a distance from said spring shackle, means for transmitting movement of said spring shackle to said link, a brake linkage including a relay lever pivotally supported at one end on said link, and forwardly and rearwardly extending pull rods of said brake linkage pivotally connected to said relay lever at spaced points.

15. In a brake linkage for motor vehicles, a chassis frame, a spring, a spring shackle movably supporting one end of said spring on said frame, an axle carried by said spring, braking mechanism carried by said axle, a link pivotally supported on said chassis frame at a distance from said spring shackle, means for transmitting movement of said shackle caused by deflection of said spring to said link, a relay lever pivotally supported at one end on said link, a first pull rod pivotally connected at an intermediate point to said relay lever and extending for actuation of said braking mechanism and a second pull rod pivotally connected to the end of said relay lever opposite to the end supported by said link.

16. In a brake linkage for motor vehicles, a chassis frame, a spring pivotally supported at one end by said frame, a spring shackle movably supporting one end of said spring on said frame, an axle carried by said spring, braking mechanism carried by said axle, a brake applying lever pivotally supported at a point fixed with respect to said frame, a link pivotally supported by said frame intermediate said brake lever and said spring shackle, a second link pivotally connecting said spring shackle and said first link, a relay lever pivotally supported at one end by said link, a first pull rod pivotally connecting the other end of said relay lever to said brake applying lever and a second pull rod pivotally connected to an intermediate point of said relay and extending for actuation of said braking mechanism whereby the axis of the pivotal connection between said first pull rod and said relay remains substantially stationary with respect to said frame during flexure of said spring.

17. In a vehicle brake linkage, a chassis frame, a spring pivoted at one end to said frame, a spring shackle pivoted to said chassis frame and pivotally connected to the other end of said spring, said spring shackle having an extension therefrom, a relay lever pivotally supported by said shackle extension at a point on the opposite side of the pivotal support of the shackle from the pivotal connection of the spring to the shackle, an axle carried by the spring, braking mechanism carried by the axle, a brake applying pull rod pivotally carried by said relay lever and a second pull rod connected for actuating said braking mechanism and pivotally connected to said relay lever at a point on the opposite side of the pivotal connection of said first pull rod from the pivotal support for said relay from said extension of said shackle whereby said second pull rod has a greater effective travel than said first pull rod and the pivotal connection of said first pull rod to said relay lever remains substantially stationary upon flexure of said spring.

18. In a brake linkage for motor vehicles, a chassis frame, a spring pivotally connected at one end to said frame, a spring shackle pivotally connected to the other end of said spring and pivotally supported upon said frame, an axle supported by said spring, braking mechanism carried by the axle, a brake applying lever pivotally supported at a point fixed with respect to said frame, a pair of brake applying pull rods, one of said pull rods being pivotally connected to said brake applying lever and the other of said pull rods being pivotally connected at one end for actuation of said braking mechanism, a relay lever, said pull rods having their other ends pivotally connected to said relay lever at spaced points and means for movably supporting one end of said relay lever upon said spring shackle the connections of the pull rods to the relay being such that in brake operation the pull rod connected for actuation of the braking mechanism has a greater effective travel than the pull rod connected to the brake applying lever, whereby the movement of said spring shackle transmitted to said relay lever tends to prevent application of said braking mechanism upon flexure of said spring.

EDWIN R. EVANS.